Oct. 11, 1938.   J. H. McCAULEY   2,133,205
ANIMATED ELECTRICAL DISCHARGE DEVICE
Filed Aug. 19, 1936   2 Sheets—Sheet 2
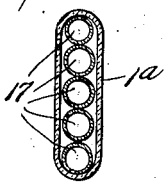
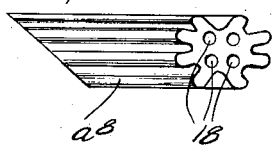
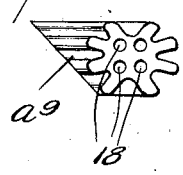
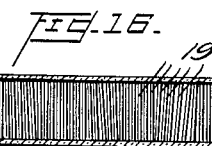
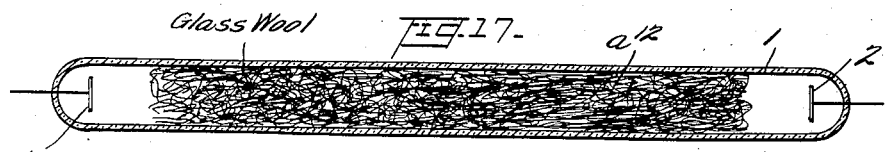
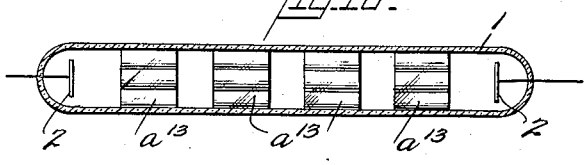
Inventor
John H. McCauley
By Robert Watson
Attorney Patented Oct. 11, 1938

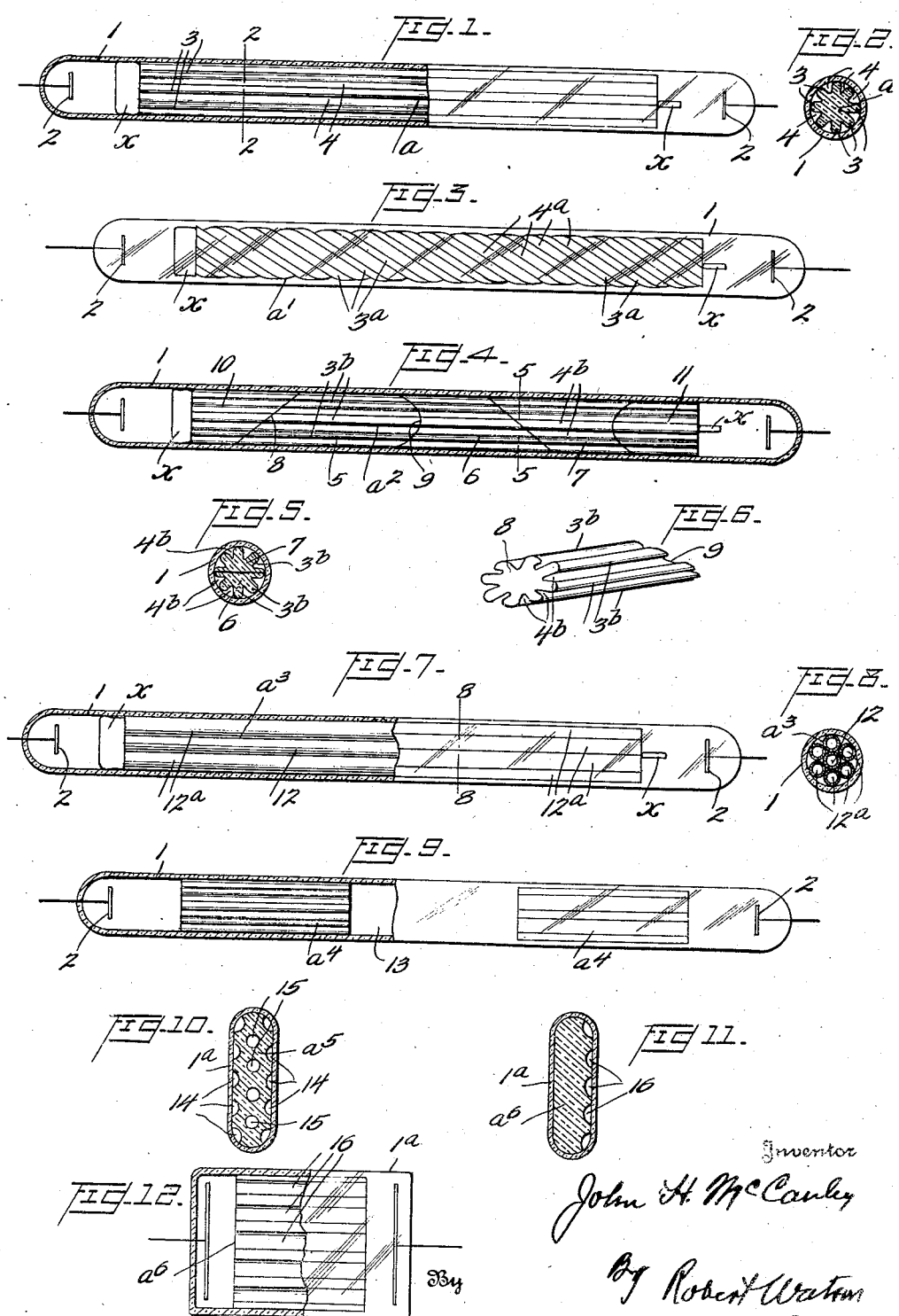

2,133,205

UNITED STATES PATENT OFFICE 2,133,205

ANIMATED ELECTRICAL DISCHARGE DEVICE

John H. McCauley, Hillside, N. J.

Application August 19, 1936, Serial No. 96,879

6 Claims. (Cl. 176—122)

This invention relates to improvements in what may be called animated luminous electrical discharge tubes. In my co-pending application Serial Number 691,551, filed September 29, 1933, I have shown such tubes with fillers of several kinds which afford a plurality of passageways for the electrical discharge through the tube, whereby the discharge takes a course which changes at frequent intervals, causing changing luminous lines to appear in the tube. In my co-pending application Serial Number 60,496, filed January 23, 1936, I have also shown fillers for producing this effect, with capacity circuits by which the course of the discharge is influenced and the rate at which it changes controlled. The present invention embodies improvements in fillers for producing these changing luminous effects, the details of which will be clear from the following specification.

In the accompanying drawings,

Fig. 1 is a side view, partly in section, of an electrical discharge tube having a filler composed of a single piece of insulating material formed with a series of straight continuous channels in its periphery, the channels being of substantially the same length and having approximately the same cross-sectional area;

Fig. 2 is a section on the line 2—2 of Fig. 1;

Fig. 3 is a side view of a tube having a filler like that shown in Fig. 1 except that the channels in the filler are spirally arranged;

Fig. 4 is a longitudinal section through a discharge tube having a filler with approximately straight channels of substantially uniform dimensions, the filler being composed of contiguous units having beveled ends;

Fig. 5 is a section on the line 5—5 of Fig. 4;

Fig. 6 is a perspective view of one of the units composing the filler of Fig. 4;

Fig. 7 is a side view, partly in section, of a tube having a filler composed of continuous glass tubes of substantially the same dimensions;

Fig. 8 is a section on the line 8—8 of Fig. 7;

Fig. 9 is a side view, partly in section, of a discharge tube having a filler in certain portions of the tube, part of the tube being without filler;

Fig. 10 shows in cross-section a flattened tube containing a flat filler channeled on both sides;

Fig. 11 is a similar view showing a filler channeled on one side only;

Fig. 12 shows in side view a flattened discharge tube with a filler like that shown in Figs. 10 or 11;

Fig. 13 is a cross-section through a flattened discharge tube showing a series of glass tubes composing the filler;

Fig. 14 is a perspective view of a filler unit having channels and perforations;

Fig. 14a is a similar view of a shorter unit;

Fig. 15 is a perspective view of a filler unit having parallel ends, the unit having perforations and peripheral grooves;

Fig. 16 is a longitudinal section through a discharge tube, showing a filler composed of perforated mica discs;

Fig. 16a is a side view of one of the discs shown in Fig. 15;

Fig. 17 is a longitudinal section through a discharge tube having a filler composed of a flexible insulating material such as glass wool, and, Fig. 18 is a longitudinal section through a discharge tube having a filler composed of glass tubing in short sections.

In Figs. 1 and 2 of the drawings, a discharge tube is shown comprising a closed glass tube or envelope 1 containing a rare gas and having electrodes 2 at its ends adapted to be connected to the secondary circuit of a high tension transformer. Within the tube, between said terminals and spaced therefrom, is a filler $a$ of insulating material, which, for a straight tube, may be made in a single piece, as shown. The filler may be of glass or porcelain, but I prefer to use a plastic insulating material which can be easily made by extrusion through a die or by cold molding, which is light in weight and preferably white in color in order to reflect the light. Strips of mica $x$, fitting tightly in the tube, hold the filler in place.

In cross-section, this filler has the form of a spur gear, as shown in Fig. 2, with alternate longitudinal ribs 3 and channels 4 at its periphery. This filler rod has a close but free fit in the tube, the ribs extending close to the tube which thus substantially encloses the channels and separates them from one another, although not necessarily gas tight. The channels are of substantially the same length and cross-sectional area so that they contain columns of the rare gas of approximately the same length and cross-sectional area and having approximately the same electrical resistance when the temperature of the gas is the same in all of the channels. Theoretically, if the columns of gas all had and maintained the same resistance, the current would divide and pass through the various columns simultaneously upon the application of the current to the tube. In practice, if the columns had exactly the same initial resistance, this would become unbalanced by the uneven heating of the gas, the resistance of which increases with increase in temperature, and the current following the course of least resistance would shift from passageway to passageway; but the shifting of the discharge is accelerated by having the gas columns of approximately, but not the same, initial resistance, and this, in practice, results from inequalities in the molding of the ribs of the channels in the filler piece and also may be brought about by design by making some of the channels slightly wider, deeper or longer than others. Thus, with the gas columns of approximately the same resistance, the discharge will seek the course of least resistance through one or more of the channels, and the gas therein becoming quickly heated, its resistance will increase and a relatively slight change in the resistance will cause the discharge to shift to another channel where the gas is cooler and consequently of lower resistance.

What has been said about the shifting of the discharge is on the assumption that it is not affected by anything but the change in the resistance of the gas due to temperature. But the shifting may be accelerated or otherwise modified by providing a capacity circuit for the tube, as described in my co-pending application, Serial Number 60,496, filed January 23, 1936.

The filler $a'$ in Fig. 3 is a one-piece filler the same in all respects as the filler in Figs. 1 and 2, except that the ribs $3^a$ and channels $4^a$ of the filler in Fig. 3 are spirally formed from end to end instead of being straight as in Fig. 1, and the action of the discharge through the passageways is also the same, except that the luminous lines will take a spiral course.

In Fig. 4, the filler $a^2$ is the same as that shown in Fig. 1, except that it is composed of contiguous sections instead of being made of a single piece. These sections may be made and fitted together in any suitable way to form through channels or passageways from end to end of the filler. In the drawings, three intermediate sections, 5, 6 and 7, are shown each of the same form as the section illustrated in Fig. 6, having the ribs $3^b$ and channels $4^b$, and having its ends 8 and 9 beveled at the same inclination to the axis of the section but at an angle of 90° to one another, while the end pieces 10 and 11 of the filler each have one beveled face to fit against a beveled face of an intermediate section and its outer end at a right angle to its axis, as shown. In fitting the pieces into the tube, one after another, the beveled faces seating against one another bring the channels and ribs into alinement to make practically continuous gas passageways from one end of the filler to another.

The action of the tube shown in Fig. 4 is substantially the same as that described in connection with Fig. 1, although the discharge will sometimes pass between the joints of the filler from one passageway to another in seeking the path of least resistance.

In Figs. 7 and 8, the filler $a^3$ is shown as composed of a cluster of glass tubes of substantially the same length and internal diameter, the cluster fitting closely within the outer envelope or tube 1. Thus, as shown in Fig. 8, there is a central tube 12 and six surrounding tubes $12^a$. The tubes are open at their ends and form through passageways for the electrical discharge, the columns of rare gas in the tubes having approximately the same resistance when the temperatures in the tubes are the same. The tubes may be of clear glass, or some or all of them may be made of colored glass to give different luminous effects. In operation, the discharge through the tubes will shift from tube to tube and may also at times pass through the spaces between the tubes. If desired, the filler tubes instead of being in single pieces may be in short sections, as illustrated in Fig. 18 and in my application aforesaid.

In Fig. 9, two relatively short pieces of filler $a^4$ of the type shown in Fig. 1 are arranged within the tube, spaced apart from one another leaving an unfilled space 13 between them. In this device, the electrical discharge will form a luminous glow at the ends of the tube and in the space 13 and the discharge will shift from channel to channel in the parts containing the filler, always seeking the course of least resistance.

The outer glass tube or envelope, instead of being circular in cross-section may be oval or flattened in cross-section, such a tube being shown at $1^a$ in Fig. 10, and the filler $a^5$ may then be of flat form with the channels 14 in its sides. The filler may be in a continuous piece or in sections and it may have openings 15 extending through it, such openings being desirable if the filler is made of glass through which the luminous discharge may be seen.

In Fig. 11, a flattened tube or envelope $1^a$ is shown with a filler $a^6$ formed to fit the tube and having channels 16 for the electrical discharge on one side only of the filler.

In Fig. 12, the discharge tube is of the flattened type shown in Figs. 10 and 11 and the filler piece may be the same as that shown in either of said Figures 10 and 11, having the alternate channels and ridges forming through passageways for the electrical discharge, as shown. The type of discharge tube and filler shown in these figures has many useful purposes.

In Fig. 13, the discharge tube $1^a$ is of the flattened type having a filler composed of a single layer of glass tubes 17 through which the luminous electrical discharge may pass and be seen. The filler tubes may be in single lengths as in Fig. 7 or they may be in short sections.

In Fig. 14 is shown a filler section $a^8$ the same as the filler piece shown in Fig. 6, but with a plurality of openings 18 extending longitudinally through the body of the section, and in Fig. $14^a$ the filler section $a^9$ is the same as that in Fig. 14, except that it is made shorter so that it may more readily be passed through curved portions of the tube. A still shorter filler section $a^{10}$ is shown in Fig. 15. The ends of this section are at right angles to its axis, and it will readily seat against similar pieces in the discharge tube. The section is shown with the ribs, channels and through openings $18^a$, the same as in Figs. 14 and $14^a$. Sections $a^{10}$ may be placed in the discharge tube so that the through openings therein as well as the ribs and channels in the peripheries may register, or, if desired, they may be placed in the discharge tube at random so that the discharge will take a tortuous course through the tube. These filler pieces, in Figs. 14, $14^a$ and 15, having the through openings, will preferably be made of glass so that the luminous lines caused by the discharge passing through said openings may be visible.

In Fig. 16, the discharge tube is shown with a filler $a^{11}$ composed of discs of mica 19, one of which is shown in side view in Fig. $16^a$, each disc having perforations $19^a$ for the electrical discharge to pass through. These discs fit closely enough within the tube so that they will be held frictionally in place side by side. The discs may be thin or thick. Being made of transparent material which is indestructible by the heat of the discharge, and also flexible, mica forms a very disirable filler. It may be cut in various shapes and sizes and arranged loosely or otherwise in the envelope in various ways, as, for instance, using short strips extending longitudinally or transversely of the tube. The discharge through such a filler takes a tortuous course.

In Fig. 17, the discharge tube 1 is shown with a filler $a^{12}$ which is flexible and may be easily inserted in the tube. This filler is preferably what is known as glass wool, being composed of tangled threads of glass. The discharge takes the course of least resistance through the interstices of this filler, shifting laterally at various places throughout the length of the filler in seeking the course of least resistance, and the luminous lines are visible throughout the tube.

In the discharge tube shown in Fig. 18, the filler is composed of glass tubing arranged in short sections $a^{13}$, spaced apart. The tubes in each section may be grouped together as are the longer glass tubes in Figs. 7 and 8, and the groups may be spaced apart, as shown, or placed close together and the tubes in the different groups may be alined with one another to make practically continuous straight discharge passageways through the entire filler, or the groups may be arranged with their passageways in staggered relation, so as to cause the electrical discharge to take a tortuous course, if desired.

The gases which are used in the tubes are the rare gases, such as neon, argon, helium or mixtures thereof, commonly used in the manufacture of neon sign tubes. The practice followed in ordinary sign manufacture of insetting mercury in the envelope to obtain more desirable effects in color and luminosity can be followed in the manufacture of my tubes containing fillers, and the results obtained in such tubes from the combination of mercury vapor with neon, argon, helium or other rare gases or mixtures thereof are very pleasing and valuable for illuminating and advertising purposes.

What I claim is:

1. A luminous electrical discharge device comprising a closed glass envelope containing a rare gas and spaced electrodes of solid material, and a filler of insulating material between said electrodes, said filler composed of contiguous sections, each section fitting closely within the envelope and having a plurality of passageways for the electrical discharge and the sections having their abutting ends formed to interfit and bring the passageways in the several sections into substantial registry with one another when the filler is inserted in the envelope.

2. A luminous electrical discharge device comprising a closed glass envelope containing a rare gas and spaced electrodes of solid material, and a filler of insulating material between said electrodes, said filler composed of contiguous sections, each section fitting closely within the envelope and having a plurality of marginal channels extending longitudinally of the envelope and the sections having their abutting ends formed to interfit and bring the channels in the several sections into substantial registry with one another when the filler is inserted in the envelope.

3. A luminous electrical discharge device comprising a closed glass envelope, flattened in cross-section, containing a rare gas and spaced electrodes, and a filler piece of insulating material fitting closely within the envelope, between said electrodes, said filler piece having a plurality of marginal channels extending longitudinally of the envelope.

4. A luminous electrical discharge device comprising a closed glass envelope, flattened in cross-section, containing a rare gas and spaced electrodes, and a filler piece of insulating material fitting closely within the envelope, between said electrodes, said filler piece having a plurality of through openings extending longitudinally of the envelope.

5. A luminous electrical discharge device comprising a closed glass tube containing a rare gas and spaced electrodes of solid material, a filler formed of white insulating material arranged within the tube between said electrodes, said filler comprising one or more pieces fitting closely within the tube and having a plurality of marginal channels extending longitudinally of the tube.

6. A luminous electrical discharge device comprising a closed glass tube containing a rear gas and spaced electrodes of solid material, a filler of insulating material arranged within the tube between said electrodes, said filler comprising one or more units fitting closely within the tube and having a plurality of passageways extending longitudinally of the tube, and wedge pieces of mica within the tube at the ends of the filler for holding it against movement in the tube.

JOHN H. McCAULEY.